(12) United States Patent
Yamanaka (10) Patent No.: US 8,279,290 B2
(45) Date of Patent: Oct. 2, 2012

(54) BLUR CORRECTING IMAGE PICKUP APPARATUS AND CONTROL METHOD

(75) Inventor: Tomoaki Yamanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 12/616,523

(22) Filed: Nov. 11, 2009

(65) Prior Publication Data

US 2010/0123787 A1 May 20, 2010

(30) Foreign Application Priority Data

Nov. 14, 2008 (JP) .................................. 2008-292343

(51) Int. Cl.
*H04N 5/228* (2006.01)
(52) U.S. Cl. ................ 348/208.5; 348/208.1; 348/208.2; 348/208.11; 348/208.16
(58) Field of Classification Search .. 348/208.99–208.2, 348/208.7–208.8
See application file for complete search history.

(56) References Cited

U.S. PATENT DOCUMENTS

| 7,012,635 B2* | 3/2006 | Umeda et al. ............... 348/208.4 |
| 7,522,188 B2* | 4/2009 | Tomita et al. ............ 348/208.11 |
| 7,932,925 B2* | 4/2011 | Inbar et al. .................. 348/208.2 |
| 2003/0030728 A1 | 2/2003 | Kudo |
| 2007/0172217 A1 | 7/2007 | Toji |

FOREIGN PATENT DOCUMENTS

| EP | 1605691 A | 12/2005 |
| JP | H10-322548 A | 12/1998 |
| JP | 2001-078075 A | 3/2001 |
| JP | 2005-351984 A | 12/2005 |
| JP | 2006-287629 A | 10/2006 |
| JP | 2007-019571 A | 1/2007 |

\* cited by examiner

*Primary Examiner* — Ngoc-Yen Vu
(74) *Attorney, Agent, or Firm* — Canon USA Inc IP Division (57) ABSTRACT

In an image pickup apparatus in which image stabilization is performed based on shake sensor and movement-vector-obtaining method which can perform accurate blur correction since shake components difficult to be detected by shake sensor can be detected by the movement-vector-obtaining method, the image blur due to high frequency vibration such as vehicle vibration cannot be corrected by the movement vector in low-frame-rate shooting since the detectable frequency band narrows in high frequency. Therefore, it is necessary to optimize the combination of blur information from the angular velocity sensor and from the movement vector, according to the frequency band detectable by the movement vector depending on change in frame rate. The combination ratio of blur correction based on blur information from angular velocity sensor, acceleration sensor and blur correction based on movement vector is determined depending on frequency detectable by the movement vector which inevitably changes depending on frame rate.

9 Claims, 11 Drawing Sheets

BLUR CORRECTING IMAGE PICKUP APPARATUS AND CONTROL METHOD

BACKGROUND OF THE INVENTION

1. Field of the Invention

The present invention relates to an image pickup apparatus, such as a camera, having an image stabilization function, and a control method thereof.

2. Description of the Related Art

Image pickup apparatuses have been automated and made multifunctional in every aspect, typically represented by auto exposure (AE) and auto focus (AF), thus enabling anybody to easily accomplish good shooting. In recent years, with the increasing trend toward a reduced size of an image pickup apparatus and a higher magnification optical system, a shake of the image pickup apparatus has been a major cause of deteriorated definition of a shot image. This problem has received attention, and there have been various types of image pickup apparatuses provided with image stabilization functions for compensating for shakes of the image pickup apparatuses.

There are two types of methods for detecting shakes. One type uses an angular velocity sensor or an acceleration sensor to detect a shake of an image pickup apparatus itself. In the other type, a movement of an object is subtracted from an image movement detected from a shot image, and a signal based on the result of the subtraction is detected as the shake of the image pickup apparatus.

Japanese Patent Application Laid-Open No. H10-322584 has proposed a technique whereby the blur signals detected according to the aforesaid two types of methods are combined to implement image stabilization. Japanese Patent Application Laid-Open No. 2007-19571 has proposed to change the weighting in synthesizing the blur information from a sensor and the blur information from a movement vector according to a shooting mode, such as a moving image shooting mode and a still image shooting mode, when implementing the blur stabilization based on the aforesaid two types of methods.

An angular velocity sensor, which is typically used as a shake detection sensor, is capable of detecting a rotational shake of an apparatus itself. However, if the position where the angular velocity sensor is installed is dislocated from the center of rotation, then the shake of the apparatus cannot be accurately detected. In addition, although the apparatus is subjected to vertical and lateral shift shakes, the angular velocity sensor is intrinsically incapable of detecting such shake components. When used for detecting shakes, an acceleration sensor is capable of detecting shift shakes, whereas a plurality of sensors is required to be installed to detect rotational shakes. Furthermore, calculating the amount of a shake from acceleration requires two stages of integration processing. This tends to cause an offset due to a computation error, making it difficult to accurately detect a shake.

Meanwhile, high-speed readout from an image pickup element and higher-speed image processing has permitted shooting at a high-speed frame rate. This has allowed a frequency band, in which a shake can be detected by a movement vector, to be sufficiently wide for detecting a hand shake or a vehicle shake. In detecting a movement vector, an angular velocity sensor is capable of detecting shake components, which are difficult to detect, thus permitting further accurate blur correction. However, in the case of shooting at a low frame rate, the frequency band in which a shake can be detected by a movement vector inconveniently narrows in the shooting at a low frame rate, so that a high-frequency shake, such as a vehicle shake, cannot be corrected. Furthermore, the movement vector requires the processing for determining whether a movement is the movement of an object. Erroneous distinction between an image blur and a movement of the object undesirably leads to unwanted image stabilization.

Accordingly, the combination of the shake information received from the angular velocity sensor and the shake information based on the movement vector must be optimized according to the frequency band, in which the movement vector can be detected, as the frame rate changes.

SUMMARY OF THE INVENTION

The present invention provides an image pickup apparatus capable of accomplishing proper correction of shakes over a wider frequency band, regardless of a frame rate.

According to one aspect of the present invention, an image pickup apparatus includes: a change unit configured to select a shooting frame rate; a detection unit configured to detect a shake of the image pickup apparatus; an obtaining unit configured to obtain information on a movement of an image among a plurality of frames taken by the image pickup apparatus; a signal processing unit configured to output a blur correction signal for correcting an image blur caused by a shake of the image pickup apparatus; and a correction unit configured to correct the blur of an image shot by the image pickup apparatus on the basis of the blur correction signal, wherein the signal processing unit is configured to combine a first blur signal obtained from the detection unit and a second blur signal obtained from the obtaining unit thereby to output the blur correction signal, and wherein a combination ratio of the second blur signal to the first blur signal in the blur correction signal is determined on the basis of the frame rate of the image pickup apparatus.

According to the present invention, the combination ratio of a blur correction based on shake information obtained by an angular velocity sensor or an acceleration sensor and a blur correction based on a movement vector information is optimized according to a frequency band in which a movement vector can be detected and which inconveniently changes with a frame rate. With this arrangement, an image pickup apparatus capable of properly correcting blurs in a wider frequency band regardless of frame rates can be provided.

Further features of the present invention will become apparent from the following description of exemplary embodiments.

DESCRIPTION OF THE EMBODIMENTS

Referring to the accompanying drawings, image pickup apparatuses having image stabilization functions, which are embodiments of the present invention, will be described below.

First Embodiment

Figure 1:
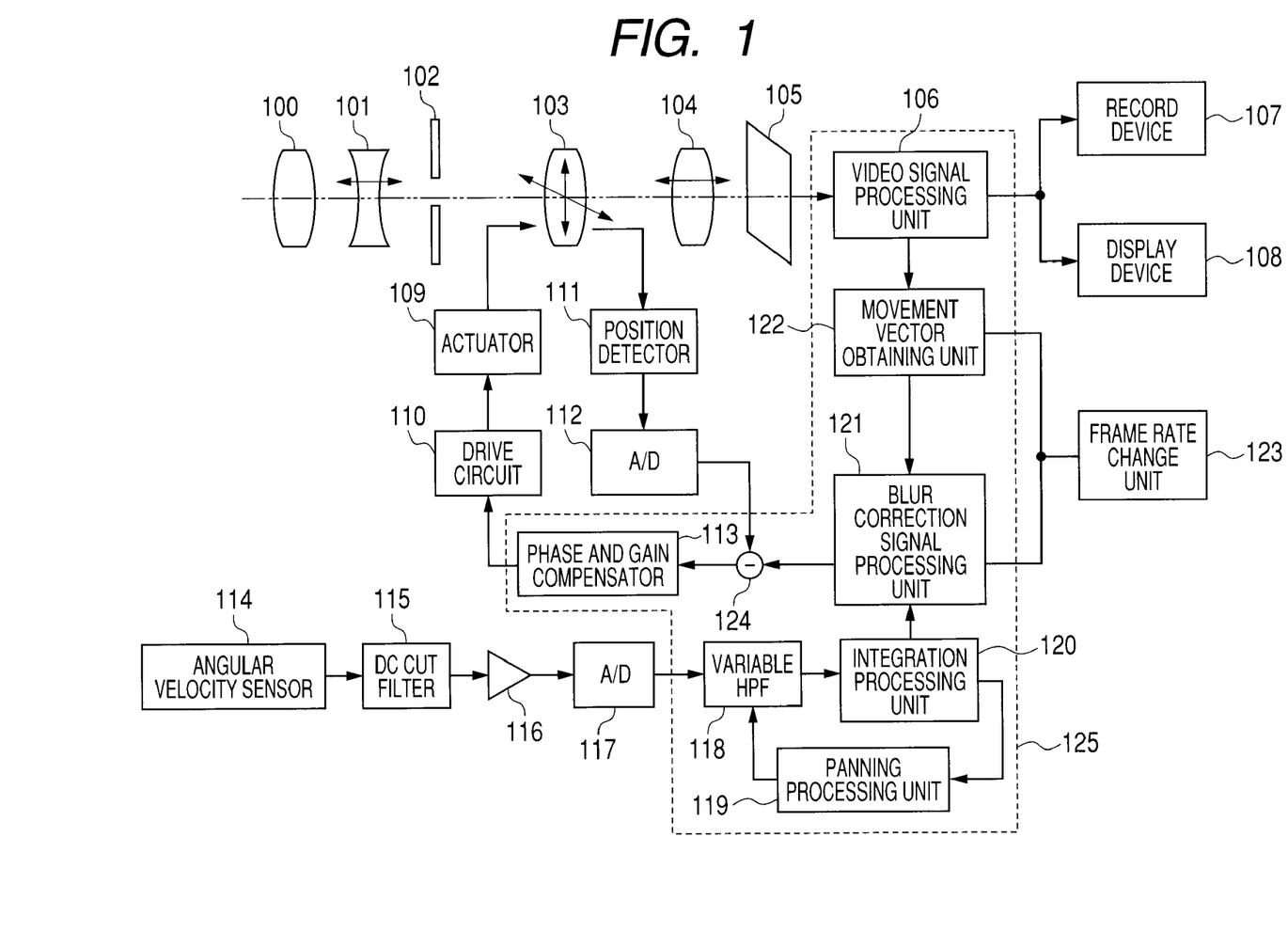
FIG. 1 is a block diagram illustrating an image pickup apparatus of a first embodiment.

FIG. 1 illustrates an example of the block diagram of an image pickup apparatus to which the present invention can be applied. Referring to FIG. 1, the image pickup apparatus has a fixed front lens unit 100, a zoom lens unit 101 which moves in the direction of an optical axis to change magnification, a shift lens unit 103 which is driven in a pitch direction (longitudinal direction) and a yaw direction (lateral direction) relative to the optical axis to make blur corrections, a focus lens unit 104 which moves in the direction of the optical axis to perform focus adjustment, and a stop unit 102 which adjusts the amount of light. The image pickup apparatus further has a CPU 125, which includes a video signal processing unit 106, a movement vector obtaining unit 122, a blur correction signal processing unit 121, a subtractor 124, a phase and gain compensator 113, a variable high-pass filter (HPF) 118, an integration processing unit 120, and a panning processing unit 119.

A beam of light from an object, which is not shown, passes through the lens units 100, 101, 103, and 104 and the stop unit 102 to form an image on the light receiving surface of an image pickup element (photoelectric transducer) 105, such as a CCD sensor or a CMOS sensor. The electric charges, which have been photoelectrically converted, are accumulated in the image pickup element 105, and the electric charges are read out by the video signal processing unit 106 at a predetermined timing. The video signal processing unit 106 also has an A/D conversion function for converting analog signals from the image pickup element 105 into digital signals. The video signal processing unit 106 carries out various types of processing, such as predetermined amplification and gamma correction, on output signals from the image pickup element 105 thereby to generate video signals. The video signals are output to a display device 108, such as a liquid crystal display panel, or a record device 107 using a tape or an optical disc. The video signals are also output to a movement vector obtaining unit 122. The detecting operation of the movement vector obtaining unit 122 will be discussed later. The movement vector obtaining unit 122 uses software signal processing so as to detect an image movement between shot images as a movement vector, thereby detecting an image blur caused by a shake of the apparatus itself.

An angular velocity sensor 114 physically detects a vibration of the image pickup apparatus. In the present embodiment, a case where the angular velocity sensor is used as the shake detection unit will be described. A DC cut filter 115 cuts off a DC component in an output signal from the angular velocity sensor 114 thereby to allow only a vibration component to pass therethrough. An amplifier 116 amplifies an angular velocity signal output from the DC cut filter 115 to a required level. The angular velocity signal, which has been amplified by the amplifier 116, is converted from the analog signal into a digital signal by an A/D converter 117 and then supplied to the variable high-pass filter 118. The variable high-pass filter 118 is a filter capable of adjusting a cutoff frequency or a gain to obtain a desired signal component. The integration processing unit 120 converts the angular velocity signal into an angle change signal, which indicates a command value for correcting a blur. The angle change signal is equivalent to an angle change shake correction amount. The panning processing unit 119 determines whether panning or tilting is being performed on the basis of an angle change shake correction amount output from the integration processing unit 120 and controls shake correction during panning/tilting by changing the characteristic of the variable high-pass filter in panning. This is the processing for reducing a pullback phenomenon or a photographer's ship sickness phenomenon in panning. In the method for physically detecting the vibration of the image pickup apparatus, an acceleration sensor may be used in place of the angular velocity sensor.

A blur correction signal processing unit (correction signal processing unit) 121 combines an output from the integration processing unit 120 and an output from the movement vector obtaining unit 122 to generate a blur correction signal for correcting an image blur of a shot image. The blur correction signal processing unit 121 changes the combination ratio of a blur correction amount according to a frame rate value from the frame rate change unit 123 (a unit for changing a frame rate). The frame rate change unit 123 changes the frame rate when a photographer manually changes the frame rate setting or the frame rate change unit 123 automatically changes the frame rate according to a shooting scene. For example, in the case of interlace shooting, the frame rate will be 60i or 50i or an even faster frame rate. For shooting an object with a low illuminance, the frame rate is reduced (slow-shutter shooting) to prolong the time for accumulation in the image pickup element.

The position of the movable shift lens unit 103 is detected by a position detector 111. The information on the detected position is converted from an analog signal to a digital signal by the A/D converter 112. The subtractor 124 calculates the difference between a target blur correction signal, which is an output of the blur correction signal processing unit, and a position signal, which has been converted into the digital signal, to compute a difference signal. The difference signal calculated by the subtractor 124 goes through the phase and gain compensator 113 to be converted into a blur correction control signal for correcting a blur. The blur correction control signal goes through a drive circuit 110 to be converted into a drive signal, which causes an actuator 109 to be driven. The actuator 109 is connected to the shift lens unit 103. The shift lens unit 103 is driven in a direction for correcting the shake in the pitch and yaw directions according to the drive signal. The position of the driven shift lens unit 103 is detected by the position detector 111. Thus, a servo control system is constructed.

The block diagram of FIG. 1 illustrates a construction for drive only in one direction, that is, either the pitch direction or the yaw direction. An actual image pickup apparatus requires two each of the control blocks from 109 to 121 and 124 in order to accomplish the drive in both pitch and yaw directions.

The movement vector obtaining unit 122 uses a correlation method or a block matching method to obtain movement vectors. According to the block matching method, the field (or the frame, which will be applied hereinafter) of an input video signal is divided into a plurality of blocks, each having an appropriate size (e.g., 8×8 lines), and the block in a preceding field, in which the correlation value relative to a particular block in a current field is minimum, is searched for. Here, the correlation value is denoted by, for example, the sum of the absolute values of the differences between the pixel values (luminance values) of the particular block and the searched block of the preceding field. Then, the relative disagreement amount and direction between the block in the preceding field in which the correlation value is minimum and the particular block in the current field are denoted in terms of the movement vector of the particular block. The movement vector detected or calculated as described above indicates the amount of movement of each pixel in a vertical direction and a horizontal direction. The movement vector indicates the amount of movement per unit time of a continuous shooting image (a field image or a frame image), so that a value proportional to the amount of movement of the continuous shooting image is obtained. As the frame rate increases, the cycle for detecting the amount of movement of the continuous image is shortened, thus allowing a high-frequency movement to be detected.

Figure 2:
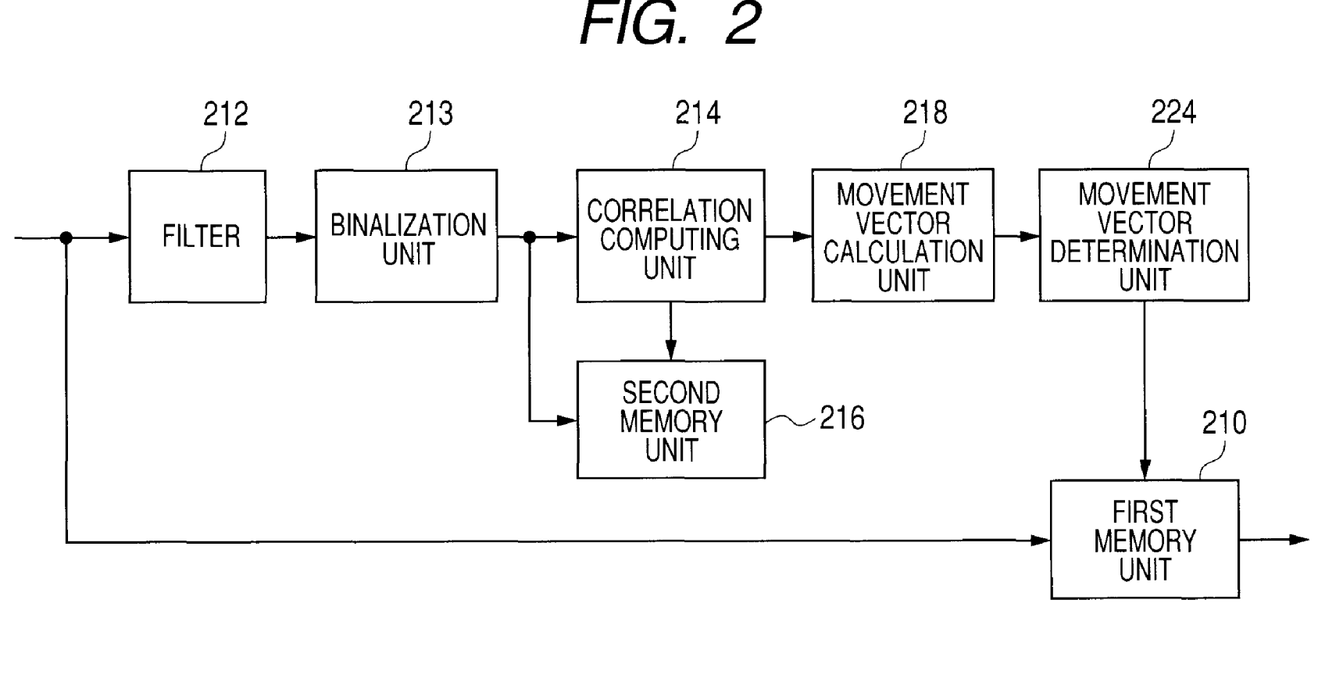
FIG. 2 is a block diagram illustrating a movement vector obtaining unit.

FIG. 2 illustrates an example of the construction of a movement vector obtaining unit using the block matching method described above. A video signal in which a movement vector is to be detected is supplied on a field-by-field basis to a first memory unit 210 and a space frequency filter 212, respectively. The first memory unit 210 is constituted by a memory which temporarily stores the image signal of one field. The filter 212 extracts a space frequency component, which is useful for detecting a movement vector from an image signal. The filter 212 is provided to remove a high space frequency component from the image signal.

The image signal, which has passed through the filter 212, is binarized by a binarization unit 213, using a predetermined level as a boundary. The binarized image signal is supplied to a correlation computing unit 214 and a second memory unit 216 serving as a one-field-period delay unit. The correlation computing unit 214 further receives the image signal of a preceding field from the second memory unit 216. The correlation computing unit 214 carries out the correlation computation of the current field and the preceding field on a block-by-block basis according to the block matching method described above, and supplies the computation results to a movement vector calculation unit 218 in the next stage.

The movement vector calculation unit 218 calculates a movement vector of each block from a given correlation value. The movement vector of each block is supplied to a movement vector determination unit 224. The movement determination unit 224 determines an entire movement vector from the movement vectors of the individual blocks. For example, the central value or a mean value of the movement vectors of the blocks is determined as the entire movement vector.

Figure 3:
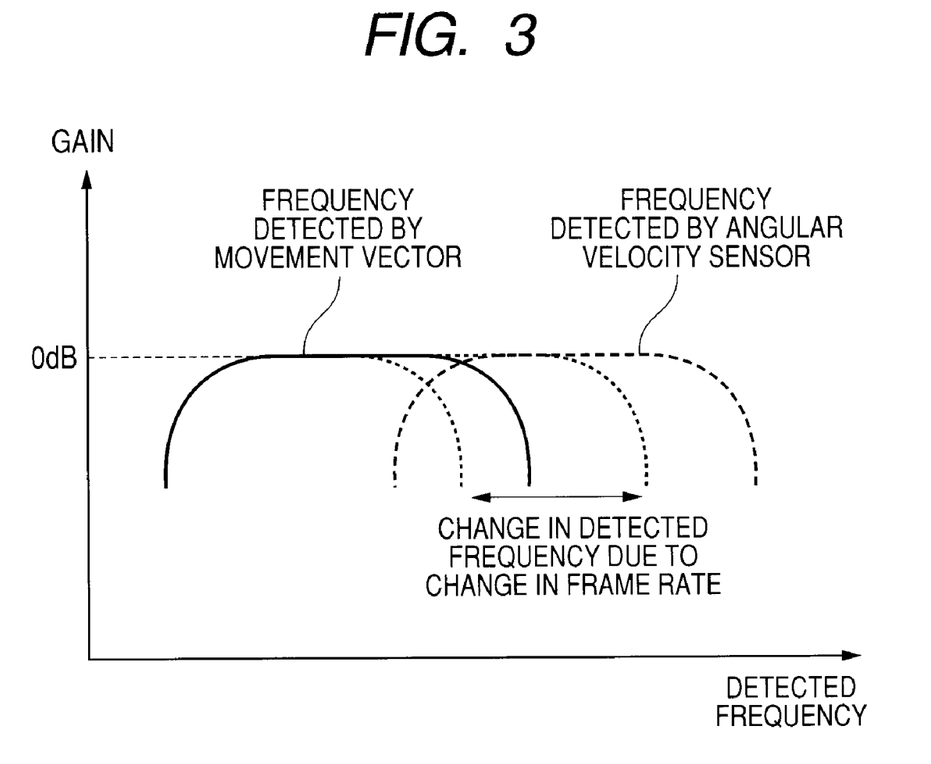
FIG. 3 is a chart illustrating the relationship between shake correction amounts based on movement vector information and detection frequencies.

FIG. 3 illustrates examples of the relationship between a detectable frequency range and a blur correction detection gain observed when an angular velocity sensor is used and the relationship between a detectable frequency range and a blur correction detection gain observed when a movement vector is used. The detectable frequency range when the angular velocity sensor is used is about 1 Hz to about 30 Hz. The detectable frequency range when a movement vector is used is about 0.1 Hz to about 1 Hz at a low frame rate, as in slow-shutter shooting or 24p shooting. The detectable frequency range is about 0.1 Hz to about 20 Hz at a high frame rate exceeding 120p. However, the detectable frequency range of movement vectors depends on the operating speed of a video processing circuit, so that movement vectors can be detected in a higher frequency range if the operating speed of the video processing circuit increases. In the present embodiment, the combination with the blur detection by the angular velocity sensor is optimized, considering a change in the movement vector detectable frequency range due to a change in frame rate.

More specifically, the combination ratio of a movement vector blur correction amount in a final blur correction amount includes a first combination ratio corresponding to a first frame rate and a second combination ratio which corresponds to a second frame rate, which is higher than the first frame rate, and which is higher than the first combination ratio.

The above has described the functions of each unit constituting the image pickup apparatus of the present embodiment and the processing flows thereof.

Figure 4:
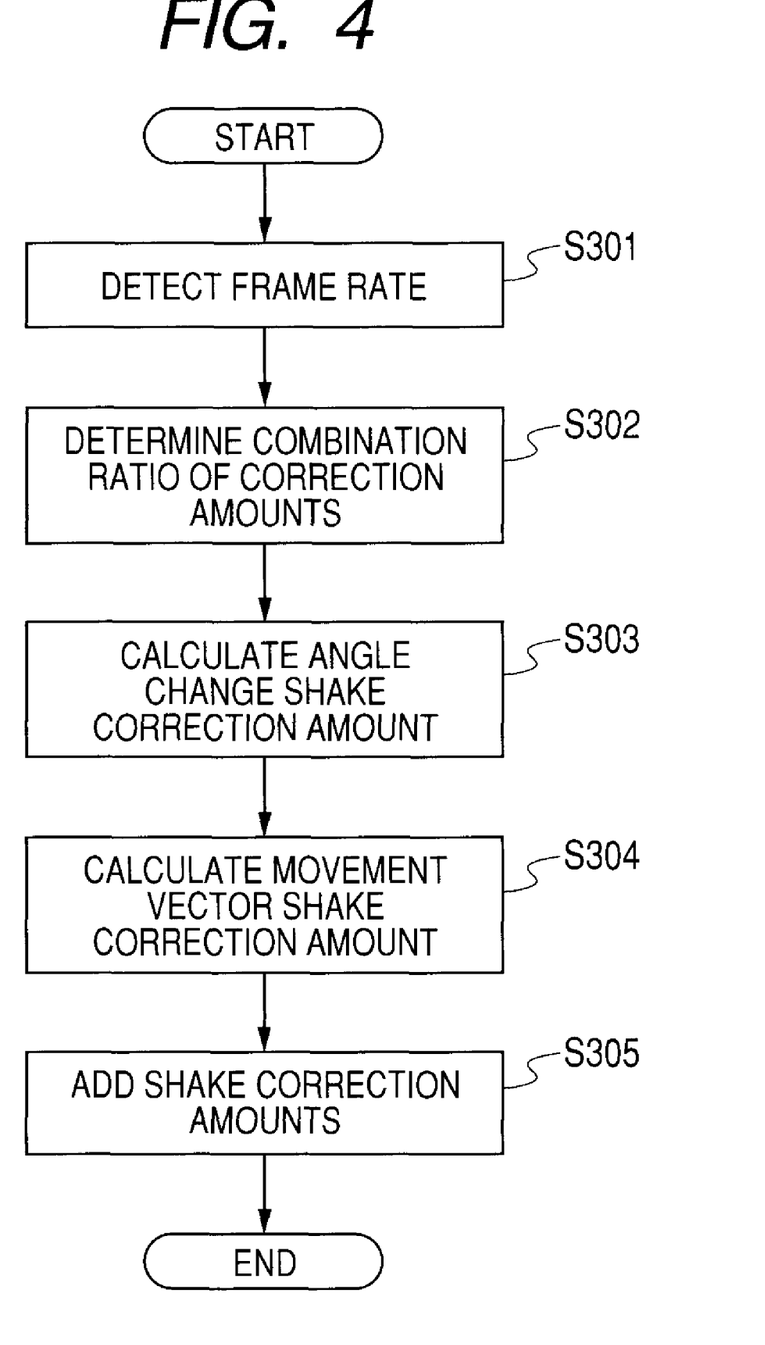
FIG. 4 is a flowchart illustrating an operation procedure of the first embodiment.

Referring now to the flowchart of FIG. 4, the operation procedure implemented by the blur correction signal processing unit 121 will be described.

(Step 301)

The procedure obtains the information on the frame rate of the shooting image that has been manually or automatically set. The frame rate herein may be alternatively referred to as the cycle of obtaining a movement vector described in connection with FIG. 2.

(Step 302)

Figure 5:
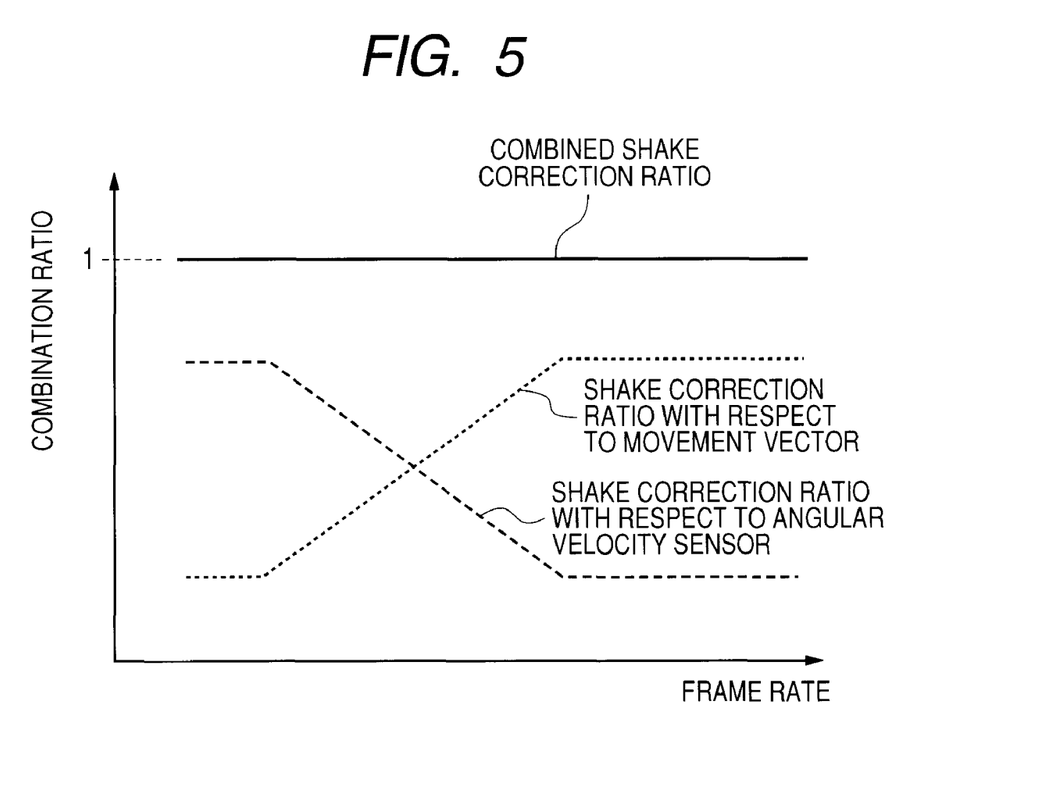
FIG. 5 is a chart illustrating the relationship between frame rates and shake correction amount combination ratios.

The procedure determines the combination ratio of the shake correction amount calculated from an angular velocity signal detected by the angular velocity sensor (the angle change shake correction amount, i.e., a first shake amount) and a shake correction amount calculated from a movement vector (a movement vector shake correction amount, i.e., a second shake amount). An example of the combination ratio is illustrated in FIG. 5. If the frame rate is low, then the frequency range wherein a shake can be detected by a movement vector is not sufficiently wide, leading to a shift toward a lower frequency. For this reason, the ratio of the angle change shake correction amount is increased. If the frame rate is high, then a shake can be detected by a movement vector in a sufficiently high frequency range. Therefore, the ratio of the movement vector shake correction amount is increased, while the ratio of the angle change shake correction amount is decreased. The combination ratios corresponding to individual frame rates are stored in the image pickup apparatus in the form of table data or calculation formulas.

The present embodiment is characterized in that the combination ratio of movement vector has an upward slope to the right, the upward slop meaning an increase with an increasing frame rate. The values of the combination ratios at low frame rates or the values of the combination ratios at high frame rates (the values on the flat line in FIG. 5) are desirably changed, as necessary, according as whether the focus is toward a wide angle end or a telephoto end or according to the accuracies of various sensors.

The advantages of the present embodiment will not be impaired even if the apparatus is constructed such that the combination ratio discretely increases rather than continuously increasing as the frame rate increases, as illustrated in FIG. 5.

(Step 303)

An angle change shake correction amount is calculated from the ratio determined in step 302 and an output result of the integration processing unit.

(Step 304)

A movement vector shake correction amount is calculated from the ratio determined in step 302 and a detected movement vector.

(Step 305)

The shake correction amounts determined in step 303 and step 304, respectively, are combined to obtain a resultant shake correction amount.

The resultant shake correction amount determined in step 305 is turned into a target shake correction signal, and the shift lens unit 103 is driven by servo control to effect the shake correction.

In the embodiment illustrated in FIG. 1, the ratio of the angle change shake correction amount has been decreased at a higher frame rate, as illustrated in FIG. 5. This enables the detection of an even higher frequency blur signal that cannot be detected by a movement vector, and also minimizes the chance of making erroneous shake corrections caused by erroneously determining a movement of an object as a blur signal when a movement vector is detected.

Second Embodiment

Figure 6:
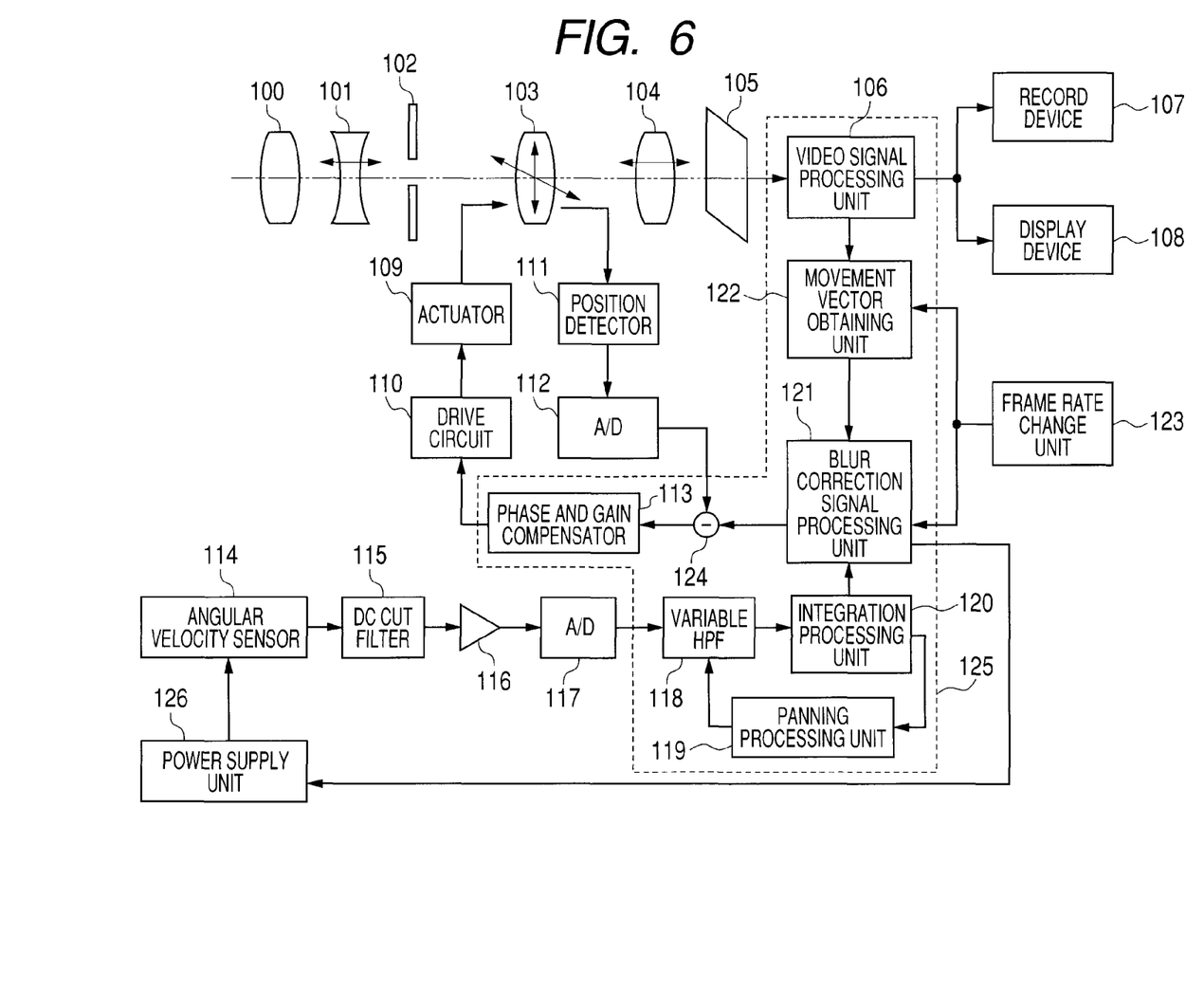
FIG. 6 is a block diagram illustrating an image pickup apparatus of a second embodiment.

FIG. 6 is a block diagram of an image pickup apparatus in the present embodiment.

The blocks from 100 to 125 have already been described, so that the descriptions thereof will be omitted. The second embodiment differs from the first embodiment in that the second embodiment is provided with a power supply unit 126 for supplying power to an angular velocity sensor 114. The power supply unit supplies power to the angular velocity sensor from a power circuit of a DC-DC converter or a regulator.

Figure 7:
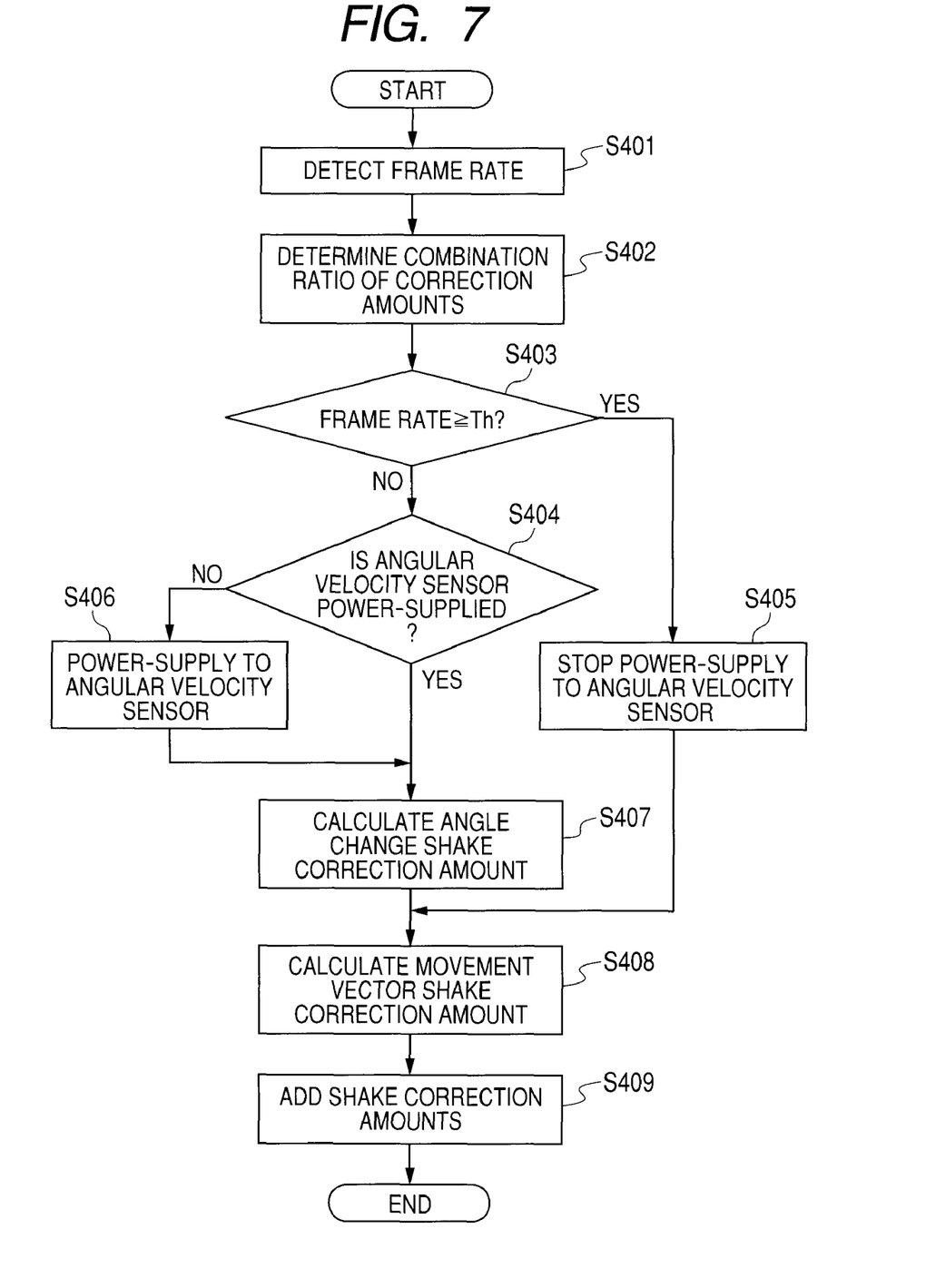
FIG. 7 is a flowchart illustrating an operation procedure of the second embodiment.

Referring to the flowchart of FIG. 7, the operation procedure implemented by a blur correction signal processing unit in the embodiment illustrated in the block diagram of FIG. 6 will be described.

(Step 401)

The procedure detects the frame rate of a shooting image that has been manually set by a photographer or automatically set by the image pickup apparatus.

(Step 402)

Figure 8:
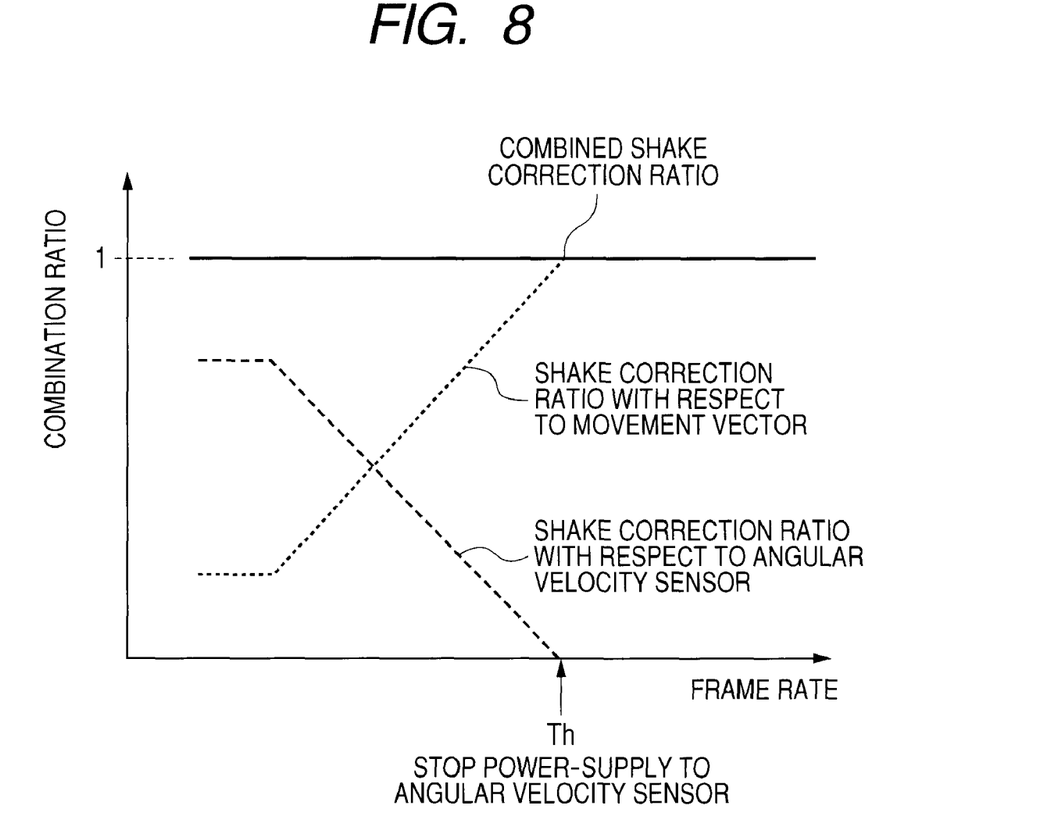
FIG. 8 is a chart illustrating the relationship between frame rates and shake correction amount combination ratios.

The procedure determines the combination ratio of the shake correction amount calculated from an angular velocity signal detected by an angular velocity sensor and a shake correction amount calculated from a movement vector. An example of the combination ratio is illustrated in FIG. 8. If the frame rate is low, then the frequency range of a shake that can be detected by a movement vector is not sufficiently wide, leading to a shift toward a lower frequency. For this reason, the ratio of the shake correction amount on the basis of the angular velocity sensor is increased. If the frame rate is high, then a shake in a sufficiently high frequency range can be detected by a movement vector. Therefore, the ratio of the shake correction amount calculated from a movement vector is increased. Further, if a shake of a sufficiently high frequency range can be detected merely by a movement vector (if the frame rate is Th or more), then the ratio of the shake correction amount calculated from the angular velocity sensor is set to zero.

(Step 403)

The procedure determines whether the frame rate is a predetermined value or more (Th or more). The predetermined value Th refers to the threshold value of frame rate that zeroes the combination ratio of an angle change shake correction amount, as illustrated in FIG. 8. If it is determined that the frame rate is Th or more, then the procedure proceeds to step 405 to turn off the power supply to the angular velocity sensor. If the frame rate is below Th, then the procedure proceeds to step 404.

(Step 404)

The procedure determines whether power is being supplied to the angular velocity sensor. If the power is being supplied, then the procedure proceeds to step 407. If the power supply is off, then the procedure proceeds to step 406 to start the power supply.

(Step 405)

The shake correction amount based on the angular velocity sensor reaches zero, so that the supply of power to the angular velocity sensor is stopped. This allows the consumption of power to be reduced.

(Step 406)

The power is supplied to the angular velocity sensor to obtain a blur signal from the angular velocity sensor.

(Step 407)

The shake correction amount (the angle change shake correction amount) based on the angular velocity sensor is calculated from the ratio determined in step 402 and the result output from the integration processing unit.

(Step 408)

According to the ratio determined in step 402, the blur correction amount based on the movement vector is calculated.

(Step 409)

The shake correction amounts determined in step 407 and step 408, respectively, are added to obtain a combined shake correction amount. However, if the frame rate is Th or more, then angle change shake correction amount determined on the basis of the angular velocity sensor is zero, so that the shake correction amount obtained here will be only a movement vector shake correction amount.

Thus, the blur correction signal is obtained on the basis of the resultant shake correction amount obtained in step 409, and the shift lens unit is driven by servo control thereby to effect the shake correction. When shooting at a high frame rate, the power consumed by the angular velocity sensor can be saved.

Third Embodiment

Figure 9:
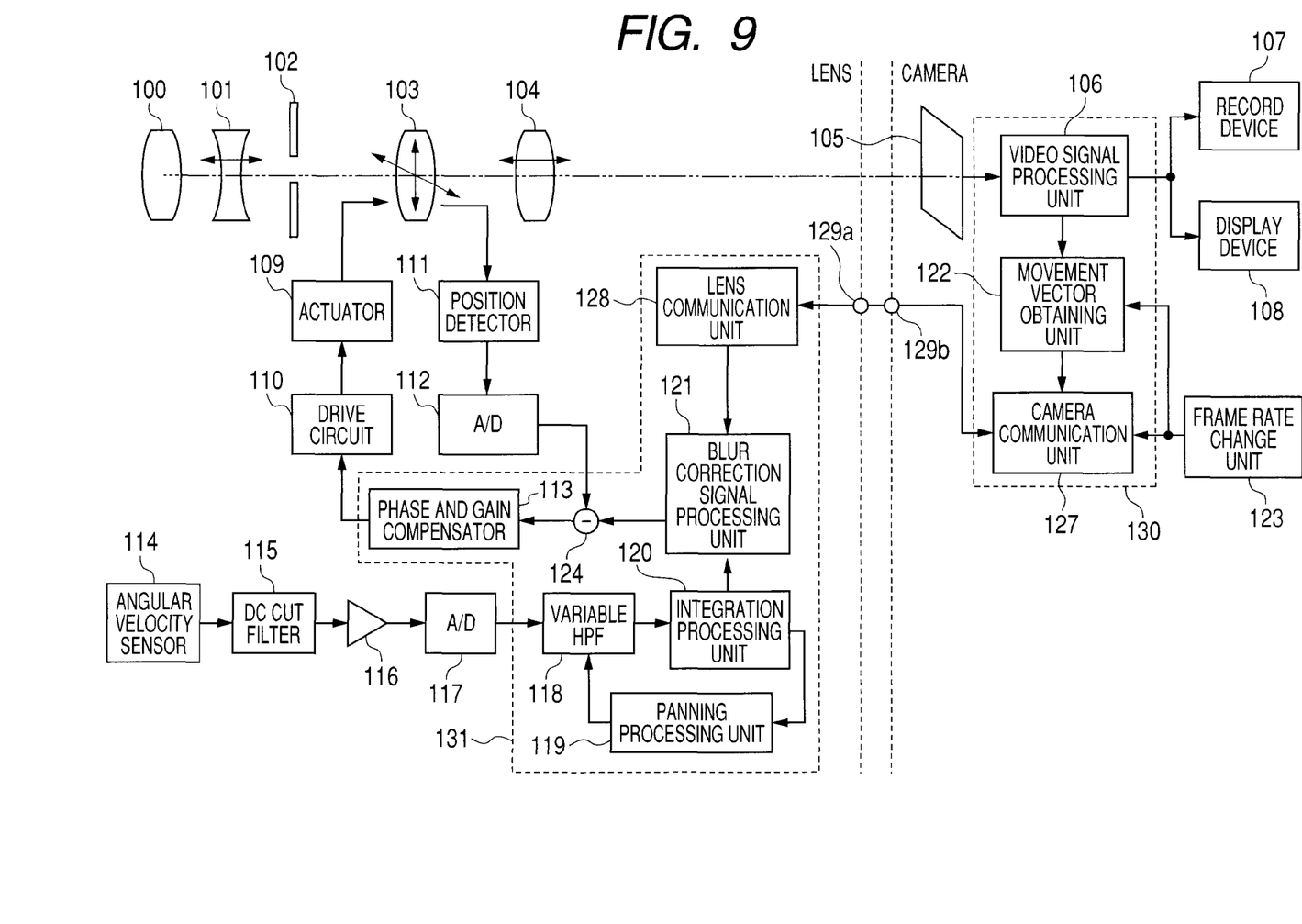
FIG. 9 is a block diagram illustrating an image pickup apparatus of a third embodiment.

Referring to the block diagram of FIG. 9, the present embodiment of an image pickup apparatus with interchangeable lenses will be described.

The description of the blocks 100 to 125 will be omitted, since these blocks have already been described. The blocks on the right side from the dashed line denote camera functions, while the blocks on the left side denote lens functions. The transfer of various types of information between a camera system and a lens system is implemented by a camera communication unit 127 and a lens communication unit 128 through communication contacts 129a and 129b. In the present embodiment, a camera CPU 130 of the camera system includes a video signal processing unit 106, a movement vector obtaining unit 122, and the camera communication unit 127. A lens CPU 131 of the lens system includes the lens communication unit 128, a blur correction signal processing unit 121, a subtractor 124, a phase and gain compensator 113, a variable high-pass filter (HPF) 118, an integration processing unit 120, and a panning processing unit 119.

The camera communication unit converts the information obtained by the movement vector obtaining unit and frame rate information into communication data and sends the communication data to the lens communication unit. The lens communication unit converts communication data into shake correction information or frame rate information on the basis of the received data. The communication may be synchronous serial communication, asynchronous communication, or wireless communication.

Figure 10:
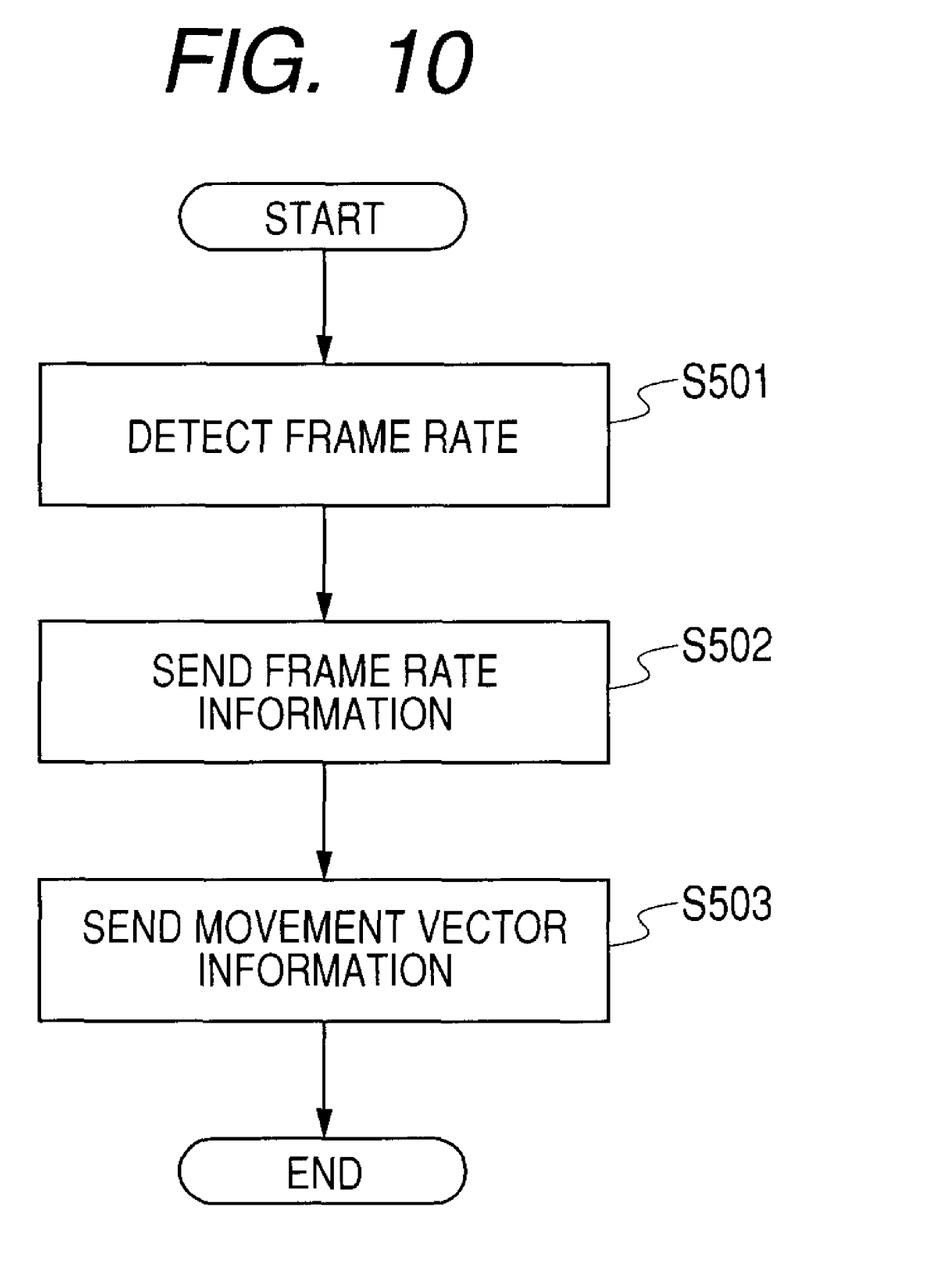
FIG. 10 is a flowchart illustrating an operation procedure of a camera system of the third embodiment.
Figure 11:
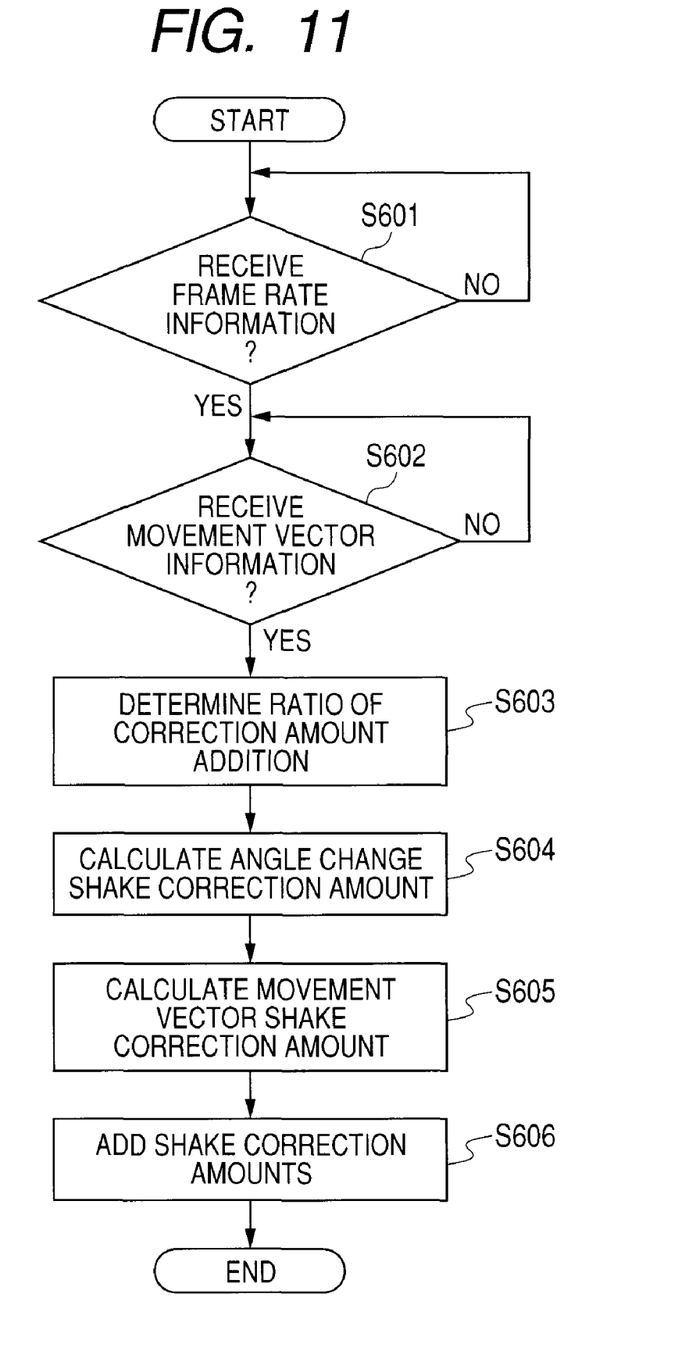
FIG. 11 is a flowchart illustrating an operating procedure of a lens system of the third embodiment.

Referring to FIGS. 10 and 11, the shake correction operation by the image pickup apparatus with interchangeable lenses in accordance with the present invention will be described. FIG. 10 is the flowchart illustrating the operation performed by the camera system.

(Step 501)
The information on the frame rate of a shooting image is obtained.

(Step 502)
The camera communication unit transmits the information on the frame rate obtained in step 501 to the lens communication unit 127 through communication contacts 129a and 129b. The information on the frame rate may be actual frame rate numbers, such as 24p, 50i, and 60i, or numeric values based on a data table determined beforehand by the camera system and the lens system (e.g., 24p=1, 50i=2, and 60i=3).

(Step 503)
The movement vector information obtained for each frame by the movement vector obtaining unit 122 is transmitted to the lens communication unit 128 through the communication contacts.

FIG. 11 is a flowchart illustrating the operation procedure of the lens system.

(Step 601)
The procedure determines whether the frame rate information selected by the camera system has been received. If the information has not been received, then the step is repeated until the information is received. If the information has been received, then the procedure proceeds to step 602.

(Step 602)
The procedure determines whether the movement vector information detected by the camera system has been received. If the information has not been received, then the step is repeated until the information is received. If the information has been received, then the procedure proceeds to step 603.

(Step 603)
Based on the frame rate received in step 601, the combination ratio of the shake correction amount calculated from an angular velocity signal detected by the angular velocity sensor and a movement vector shake correction amount is determined. The combination ratio is, for example, the ratio shown in FIG. 5, as described above.

(Step 604)
From the ratio determined in step 603 and a result output from the integration processing unit 120, the shake correction amount (a first shake amount) based on the angular velocity sensor is calculated.

(Step 605)
The movement vector shake correction amount is calculated from the ratio determined in step 603 and the movement vector information received by the lens communication unit.

(Step 606)
The shake correction amounts determined in step 604 and step 605, respectively, are combined to obtain the resultant shake correction amount. The resultant shake correction amount determined in this step 606 is used as a blur correction signal, and the shift lens unit 103 is driven by the servo control thereby to effect the shake correction.

Thus, also in the image pickup apparatus with interchangeable lenses, the combination ratio of the shake correction based on shake information received from the angular velocity sensor or the acceleration sensor and the shake correction based on movement vector information is changed according to the movement vector detectable frequency, which inconveniently changes with a frame rate. This arrangement permits the provision of an image pickup apparatus having an image stabilization function capable of achieving further proper corrections of shakes in a wider frequency range, including hand shakes and vehicle shakes, regardless of frame rate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-292343, filed Nov. 14, 2008, which is hereby incorporated by reference herein in its entirety.

What is claimed is:

1. An image pickup apparatus comprising:
a change unit configured to select a shooting frame rate;
a detection unit configured to detect a shake of the image pickup apparatus;
an obtaining unit configured to obtain information on a movement of an image among a plurality of frames taken by the image pickup apparatus;
a signal processing unit configured to output a blur correction signal for correcting an image blur caused by a shake of the image pickup apparatus; and
a correction unit configured to correct the blur of an image shot by the image pickup apparatus on the basis of the blur correction signal,
wherein the signal processing unit is configured to combine a first signal obtained by multiplying a first coefficient by a first blur signal obtained from the detection unit and a second signal obtained by multiplying a second coefficient by a second blur signal obtained from the obtaining unit thereby to obtain the blur correction signal, and
wherein the signal processing unit is configured to decrease the first coefficient and to increase the second coefficient, while the shooting frame rate becomes high.

2. The image pickup apparatus according to claim 1, further comprising a power supply unit configured to supply power to the detection unit,
wherein the signal processing unit is configured to stop the power supplied to the detection unit by the power supply unit in the case where the frame rate is a predetermined value or more.

3. The image pickup apparatus according to claim 1, wherein the detection unit is configured to detect an angular velocity of the image pickup apparatus.

4. The image pickup apparatus according to claim 1, wherein the detection unit is configured to detect an acceleration of the image pickup apparatus.

5. The image pickup apparatus according to claim 1, wherein the signal processing unit is configured to continuously decrease the first coefficient and to continuously increase the second coefficient, while the shooting frame rate becomes high.

6. The image pickup apparatus according to claim 1, wherein the signal processing unit is configured to discretely decrease the first coefficient and to discretely increase the second coefficient, while the shooting frame rate becomes high.

7. A signal processing unit which outputs a blur correction signal for use by a correction unit to correct an image blur, the correction unit driving a correction optical system used to correct the image blur caused by a shake of an image pickup apparatus, wherein the signal processing unit is configured to combine a first signal obtained by multiplying a first coefficient by a first blur signal obtained from a detection unit configured to detect a shake of the image pickup apparatus, and a second signal obtained by multiplying a second coefficient by a second blur signal obtained from an obtaining unit configured to obtain information on the movement of an image among a plurality of frames taken by the image pickup apparatus, and to obtain the blur correction signal, and wherein the signal processing unit is configured to decrease the first coefficient and to increase the second coefficient, while a shooting frame rate becomes high.

8. A control method for an image pickup apparatus, comprising:

a frame rate detection step for detecting a shooting frame rate;

a shake detection step for detecting a shake of the image pickup apparatus;

an obtaining step for obtaining information on the movement of an image among a plurality of frames taken by the image pickup apparatus; and a combination step for combining a first signal obtained by multiplying a first coefficient by a first blur signal obtained from a result of the shake detection step and a second signal obtained by multiplying a second coefficient by a second blur signal obtained from a result of the movement obtaining step thereby to obtain a blur correction signal, wherein the first coefficient is decreased and the second coefficient increased, while the shooting frame rate becomes high.

9. An image pickup apparatus comprising:

a change unit configured to select a shooting frame rate;

a detection unit configured to detect a shake of the image pickup apparatus;

an obtaining unit configured to obtain information on a movement of an image among a plurality of frames taken by the image pickup apparatus;

a signal processing unit configured to output a blur correction signal for correcting an image blur caused by a shake of the image pickup apparatus;

a correction unit configured to correct the blur of an image shot by the image pickup apparatus on the basis of the blur correction signal; and a power supply unit configured to supply power to the detection unit, wherein the signal processing unit is configured to combine a first blur signal obtained from the detection unit and a second blur signal obtained from the obtaining unit thereby to output the blur correction signal, wherein a combination ratio of the second blur signal to the first blur signal in the blur correction signal is determined on the basis of the frame rate of the image pickup apparatus, and wherein the signal processing unit is configured to stop the power supplied to the detection unit by the power supply unit in the case where the frame rate is a predetermined value or more.

* * * * *